(12) United States Patent
Hollis et al.

(10) Patent No.: US 11,070,510 B1
(45) Date of Patent: Jul. 20, 2021

(54) OBTAINING SUMMARY CONTENT FROM SERVER

(71) Applicant: Snap Inc., Santa Monica, CA (US)

(72) Inventors: Benjamin Ralph Hollis, Seattle, WA (US); Bradley Baron, Seattle, WA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/797,559

(22) Filed: Feb. 21, 2020

(51) Int. Cl.
*H04L 12/58* (2006.01)

(52) U.S. Cl.
CPC ............ *H04L 51/32* (2013.01); *H04L 51/046* (2013.01); *H04L 51/16* (2013.01)

(58) Field of Classification Search
CPC ....... H04L 51/32; H04L 51/046; H04L 51/16; H04L 51/22; H04L 51/26
See application file for complete search history.

(56) References Cited

U.S. PATENT DOCUMENTS

| | | | | |
|---|---|---|---|---|
| 6,816,884 B1 * | 11/2004 | Summers | ............. | G06Q 10/107 709/202 |
| 7,082,458 B1 * | 7/2006 | Guadagno | ............ | G06Q 10/107 709/204 |
| 8,024,415 B2 * | 9/2011 | Horvitz | ................... | H04L 51/12 709/207 |
| 9,485,212 B1 * | 11/2016 | Bastide | .................... | H04L 51/16 |
| 10,785,185 B2 * | 9/2020 | Vennam | ................ | H04L 65/403 |
| 2002/0099775 A1 * | 7/2002 | Gupta | ..................... | H04L 51/34 709/205 |
| 2003/0028603 A1 * | 2/2003 | Aktas | ...................... | H04L 51/22 709/206 |
| 2003/0177190 A1 * | 9/2003 | Moody | ................... | H04L 51/00 709/206 |
| 2005/0262214 A1 * | 11/2005 | Bagga | .................. | G06Q 10/107 709/207 |
| 2009/0157709 A1 * | 6/2009 | Kruger | .............. | G06F 16/90335 |
| 2013/0198296 A1 * | 8/2013 | Roy | ....................... | G06Q 10/107 709/206 |
| 2014/0310365 A1 * | 10/2014 | Sample | ................... | H04L 51/16 709/206 |
| 2015/0341300 A1 * | 11/2015 | Swain | .................. | G06F 16/287 707/738 |
| 2016/0037312 A1 * | 2/2016 | Chuang | ................. | H04L 51/063 455/466 |
| 2016/0065509 A1 * | 3/2016 | Yang | ................... | G06F 3/04886 715/752 |
| 2017/0124038 A1 * | 5/2017 | Upadhyay | ............. | G06F 16/345 |
| 2017/0147172 A1 * | 5/2017 | Klassen | ............... | G06F 3/0484 |
| 2017/0351385 A1 * | 12/2017 | Ertmann | ................ | H04L 51/24 |
| 2018/0012598 A1 * | 1/2018 | Thirukovalluru | ..... | G06F 16/313 |

(Continued)

*Primary Examiner* — Jerry B Dennison
(74) *Attorney, Agent, or Firm* — Schwegman Lundberg & Woessner, P.A.

(57) ABSTRACT

Systems and methods are provided for synchronizing messages. The systems and methods include operations for: accessing, by a server, a plurality of messages of a communication session implemented by a messaging application on a user device; generating, by the server, a summary of the communication session based on the plurality of messages; transmitting, by the server, data associated with the summary to the user device; and causing the user device to display of a summary view of the communication session based on the data received by the user device from the server.

20 Claims, 7 Drawing Sheets

(56) References Cited

U.S. PATENT DOCUMENTS

| | | | |
|---|---|---|---|
| 2018/0083904 A1* | 3/2018 | Jayaram | H04L 51/22 |
| 2019/0087491 A1* | 3/2019 | Bax | H04L 51/043 |
| 2019/0215288 A1* | 7/2019 | Diriye | H04L 51/18 |
| 2019/0334844 A1* | 10/2019 | Le Huerou | H04L 51/02 |
| 2019/0386937 A1* | 12/2019 | Kim | G06F 40/151 |
| 2019/0386949 A1* | 12/2019 | Vennam | G06Q 10/109 |
| 2020/0162838 A1* | 5/2020 | Okubi | G06F 16/9537 |
| 2020/0236082 A1* | 7/2020 | Hyman | H04L 51/36 |
| 2020/0285360 A1* | 9/2020 | Klassen | G06F 3/0482 |

* cited by examiner

OBTAINING SUMMARY CONTENT FROM SERVER

TECHNICAL FIELD

The present disclosure generally relates to the technical field of social networks. In particular, the present embodiments are generally directed to managing message synchronization.

BACKGROUND

As the popularity of social networking grows, social networks are expanding their capabilities. To improve ease of use, social networks are integrating more and more functions such that a user may accomplish many or even most of their computer-based tasks within the social network itself. One vision of social networks is that they eventually become a virtual operating system, from which a user seldom finds a need to remove themselves.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
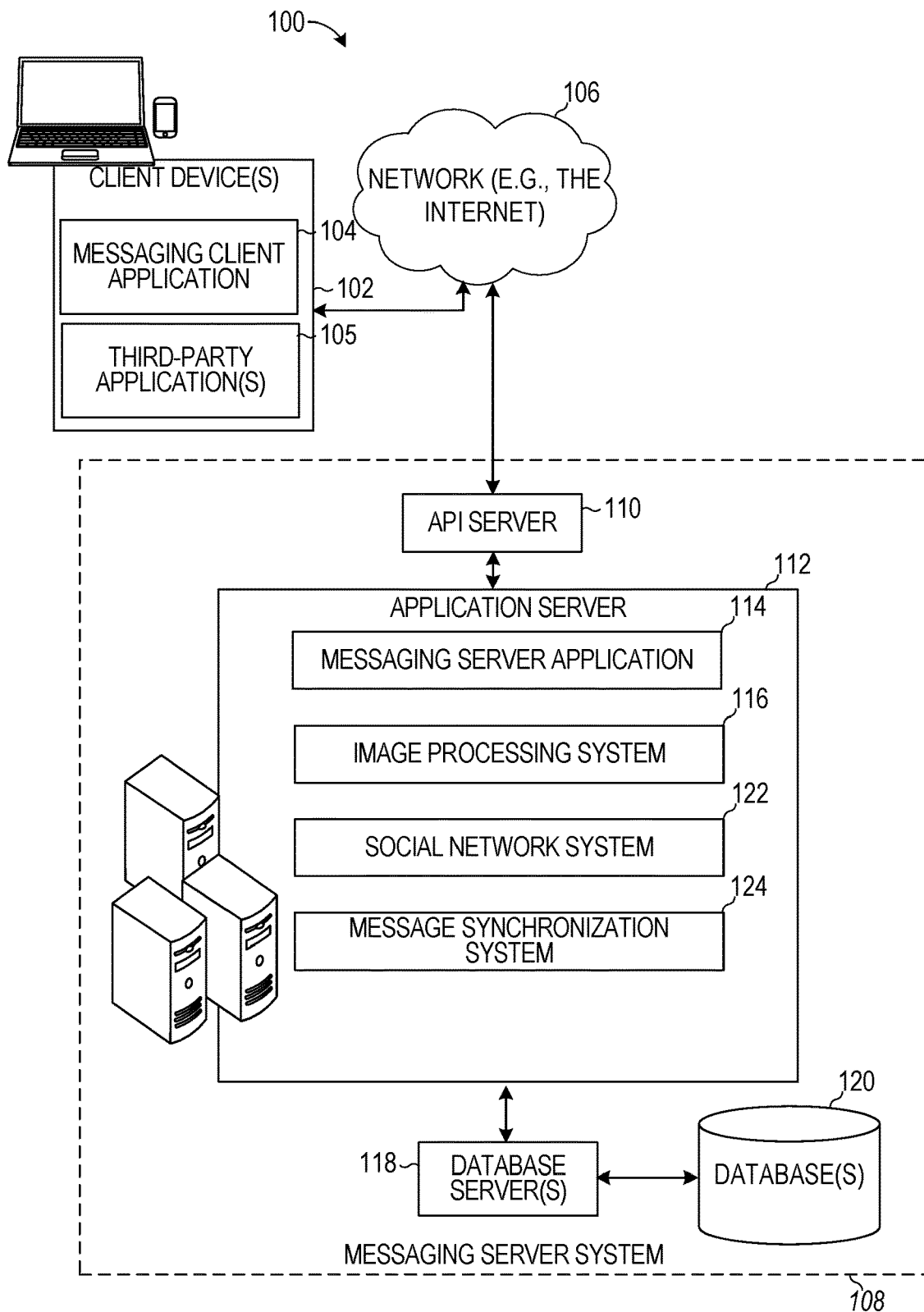
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Often, users consume media content, and specifically videos, on a user device, such as a mobile device. Such media content is typically exchanged in chat sessions between users. Sometimes users log on and log off a server that maintains the contents of the chat sessions. In order to ensure that the latest chat messages, that were exchanged in the chat session while the user device has been disconnected from the server, are presented to the user, a user device synchronizes with the server. Typically, the server will send the content of all the messages that were exchanged while the user device was disconnected from the server. Some of these messages are rich in large-sized content, such as videos and images. Synchronizing such content between a server and a user device consumes a great deal of processing resources, battery, and network bandwidth which makes synchronization sessions operate inefficiently. Also, synchronizing such content can take a long time which further delays presenting the latest chat messages to the user and can end up frustrating the users.

In some cases, a user device, after receiving all the content from the server during a synchronization session, processes the content to generate a summary view of the content. Generating such a summary view is very time consuming and consumes a great deal of resources. This not only introduces delays in presenting content to the user, but ends up requiring messages to be obtained from the server that may not end up even being presented to the user. In this way, a tremendous amount of bandwidth is wasted along with battery power of the user device.

The disclosed embodiments improve the efficiency of using the user device by providing a system that efficiently synchronizes content between a server and a user device. According to the disclosed system, the server processes the content of all of the messages from multiple conversations in which the client device is involved. The server applies a complex model that specifies various rules and heuristics for identifying important messages in the conversations. The server then generates a summary that includes only those important messages. When the user device ultimately requests to synchronize its content with the server, the server provides data representing the summary to the user device. The user device can then generate a summary view of the conversations in which the user device is involved based on the summary received from the server. Because the user device need not receive all of the messages to generate the summary view and need not locally apply complex heuristics and rules, the summary view can be quickly presented to a user almost instantaneously without consuming a great deal of bandwidth and processing resources. A user can then hand pick certain conversations of interest based on the summary view that is presented and messages associated with the selected conversation are then retrieved from the server. In some cases, the user device automatically retrieves or pre-fetches the messages from the conversations that are included in the summary view to avoid further delays when the user ultimately selects to view a given conversation. Only messages that are part of conversations that are not represented in the summary view are excluded from being downloaded from the server until a specific user request is received to view such conversations.

In this way, rather than sending the entire contents of the messages exchanged as part of a communication session after a user device reconnects to a server, the disclosed system only sends those messages that are predicted to be of interest to the user and that the server determines are to be included in a summary view. This increases the efficiencies of the user device by reducing processing times and network bandwidth needed to accomplish a task.

FIG. 1 is a block diagram showing an example messaging system 100 for exchanging data (e.g., messages and associated content) over a network 106. The messaging system 100 includes multiple client devices 102 (e.g., user devices), each of which hosts a number of applications, including a messaging client application 104 and a third-party application 105. Each messaging client application 104 is communicatively coupled to other instances of the messaging client application 104, the third-party application 105, and a messaging server system 108 via a network 106 (e.g., the Internet).

Accordingly, each messaging client application 104 and third-party application 105 is able to communicate and exchange data with another messaging client application 104 and third-party application(s) 105 and with the messaging server system 108 via the network 106. The data exchanged between messaging client applications 104, third-party applications 105, and the messaging server system 108 includes functions (e.g., commands to invoke functions) and payload data (e.g., text, audio, video, or other multimedia data). Any disclosed communications between the messaging client application 104 and the third-party application(s) 105 can be transmitted directly from the messaging client application 104 to the third-party application(s) 105 and/or indirectly (e.g., via one or more servers) from the messaging client application 104 to the third-party application(s) 105.

The third-party application(s) 105 and the messaging client application 104 are applications that include a set of functions that allow the client device 102 to access a message synchronization system 124. The third-party application 105 is an application that is separate and distinct from the messaging client application 104. The third-party application(s) 105 are downloaded and installed by the client device 102 separately from the messaging client application 104. In some implementations, the third-party application(s) 105 are downloaded and installed by the client device 102 before or after the messaging client application 104 is downloaded and installed. The third-party application 105 is an application that is provided by an entity or organization that is different from the entity or organization that provides the messaging client application 104.

The third-party application 105 is an application that can be accessed by a client device 102 using separate login credentials than the messaging client application 104. Namely, the third-party application 105 can maintain a first user account and the messaging client application 104 can maintain a second user account. For example, the third-party application 105 can be a social networking application, a dating application, a ride or car sharing application, a shopping application, a trading application, a gaming application, or an imaging application.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an API server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 and the third-party application 105 in order to invoke functionality of the application server 112. The API server 110 exposes various functions supported by the application server 112, including account registration; login functionality; the sending of messages, via the application server 112, from a particular messaging client application 104 to another messaging client application 104 or third-party application 105; the sending of media files (e.g., images or video) from a messaging client application 104 to the messaging server application 114, and for possible access by another messaging client application 104 or third-party application 105; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and the message synchronization system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by the message synchronization system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends. Social network system 122 may access location information associated with each of the user's friends to determine where they live or are currently located geographically. Social network system 122 may maintain a location profile for each of the user's friends indicating the geographical location where the user's friends live.

The message synchronization system 124 manages synchronization of messages exchanged in a communication session. For example, the message synchronization system 124 establishes a communication session between a plurality of users (e.g., a chat session in which multiple chat messages are exchanged). The messaging client application 104 implemented on the client device 102 communicates with the message synchronization system 124 to receive messages transmitted as part of the communication session. Specifically, messages are sent from one user to another via the message synchronization system 124. The message synchronization system 124 keeps track of all the messages that are exchanged and sends updates to client devices 102 that are connected to the message synchronization system 124.

In some cases, the message synchronization system 124 stores and processes all of the messages that are exchanged as part of multiple conversations in which a given client device 102 (e.g., via messaging client application 104) is involved. The message synchronization system 124 applies various heuristics, rules and/or machine learning models to the messages to identify a message from each conversation or a subset of the conversations that is most important in that conversation. The identified messages are selected by the message synchronization system 124 to be included in a summary. In on example, the summary is an at-a-glance snapshot of the current state of each of a plurality of conversations in which a given client device 102 is involved. The summary may include the entire contents, or a segment of the last message exchanged in each of the plurality of conversations and/or an identification of a video or image that was exchanged in a given one of the conversations. In an example, the summary view that is generated by the client device 102 is based on the summary data obtained from the server. The summary view includes a simultaneously display of a plurality of cells arranged in one or more columns. Each cell in the plurality of cells represents a particular conversation in which a user of the client device 102 participates. Each cell identifies the conversation by name, participants, subject matter, or other suitable information and may include identifiers (e.g., avatars) of the participants involved in the conversation for the cell. A user can select a given cell to view the contents (e.g., all the messages, images, and videos) exchanged between users of the conversation. Each cell also includes a summary field which includes one or more identifiers of messages and/or contents of selected messages from the conversation. Such identifiers of messages and/or contents correspond to messages that were exchanged in the conversation after a last time the client device 102 synchronized its data with the server (e.g., after the last time all of the content from the server for the conversations was completely received from the server). The summary field may include the last message exchanged in the conversation and/or a message exchanged in the conversation that is determined and indicated by the server to the client device 102 as being most important to the user of the client device 102. Such messages may be received concurrently with or immediately after the summary data from the server that is used to populate the summary field of each cell. In some cases, the cells themselves are sorted and arranged based on importance information that is received by the client device 102 from the server. In this way, messages and/or conversations are downloaded and received from the server in priority order based on importance as indicated by the summary data received from the server that is generated based on one or more rules in the model by the server.

In one example embodiment, the summary identifies a given message of a given conversation by sequence number. Specifically, the message synchronization system 124 may identify a first message in a first conversation as being most important in the first conversation. The first message may be the last message exchanged in the first conversation or the first message that was exchanged in the conversation after the given client device 102 last connected or synchronized with the server (e.g., the message may be a message in the conversation with a timestamp that is later than the timestamp of the last time the client device 102 synchronized with the server but earlier than timestamps of other messages exchanged in the conversation). The message synchronization system 124 retrieves a sequence number or unique identifier of the first message and the first conversation and includes that sequence number or identifier in a summary. The message synchronization system 124 may also identify a second message in a second conversation as being most important to the second conversation. The message synchronization system 124 retrieves a sequence number or unique identifier of the second message and the second conversation and includes that sequence number or identifier in the summary.

At a later time, the message synchronization system 124 may receive a request from the given client device 102 to synchronize content of the given client device 102. In response, the message synchronization system 124 provides the data included in the summary (e.g., the sequence numbers and/or identifiers of the messages in the summary) to the given client device 102. In some cases, the message synchronization system 124 provides the contents of each message that is identified in the summary to the given client device 102.

The given client device 102 then immediately presents a summary view that includes the summary data received from the server. For example, the given client device 102 presents simultaneously a set of conversation identifiers of all or some of the conversations in which the given client device 102 is involved. For each conversation that is simultaneously presented in the summary view, the given client device 102 presents the message provided in the summary for that conversation. For example, a first conversation identifier includes the content of the last message exchanged in that first conversation while a second conversation identifier (in the same summary view simultaneously with the first conversation identifier) includes the content of a message exchanged in the second conversation that includes video or image content but not text and that is not the last message exchanged in the second conversation. The given client device 102 may receive input from the user that selects a given conversation identifier from the summary view. In response, the given client device 102 retrieves, from the server, messages that are part of the selected conversation identifier and that have not previously been retrieved from the server.

In some cases, the given client device 102 automatically obtains, together with the summary data from the server, the messages that are part of conversations that are identified in the summary data. For example, the message synchronization system 124 may include data for a first conversation in the summary that is provided to the client device because the message synchronization system 124 determines that the first conversation includes one or more important messages. The message synchronization system 124 may not include in the summary data message information for a third conversation because the message synchronization system 124 determines that the third conversation does not include any important messages. In this case, the message synchronization system 124 provides to the client device 102, the summary data and the messages that are part of the first conversation but does not provide the messages that are part of the third conversation. In response to the client device 102 receiving a request to access the third conversation, the client device 102 specifically requests that the message synchronization system 124 provide the contents of the third conversation.

To identify which messages in conversations are important, the message synchronization system 124 employs a model. The model may include a set of rules that specify parameters for selecting or identifying messages for inclusion in a summary. For example, a first rule or parameter may indicate that a conversation that includes a set of messages that include images or videos have a higher priority as being more important than messages that only include text. This is because the images or videos may form part of a story and need to be viewed in sequence. In such cases, the first rule specifies that the first image or video that was exchanged in the given conversation after the last time the given client device 102 synchronized its content with the server be identified as more important than other messages in the conversation that were exchanged after the last time the given client device 102 synchronized with the server. Namely, rather than selecting the last message exchanged in the conversation as being the most important and for inclusion in the summary, the message synchronization system 124 selects the first message in a sequence of messages that were exchanged after the given client device 102 last synchronized with the server and that includes images or videos. The message synchronization system 124 may identify several message that each include images or videos and may select the first of the several messages (e.g., the message with the earliest timestamp) as being the most important and for inclusion in the summary.

In some cases, a second rule or parameter indicates that messages that include video and audio are more important than messages that include video and no audio. In such cases, the second rule specifies that the first image or video with audio that was exchanged in the given conversation after the last time the given client device 102 synchronized its content with the server be identified as more important than a second image or video without audio in the conversation that was exchanged after the last time the given client device 102 synchronized with the server. Namely, rather than selecting the last message exchanged in the conversation as being the most important and for inclusion in the summary, the message synchronization system 124 selects the first message in a sequence of messages that were exchanged after the given client device 102 last synchronized with the server and that includes images or videos with audio over messages that include images and videos without audio.

In some cases, a third rule or parameter indicates that messages received in a conversation from a particular user (e.g., a previously designated friend or an automatically identified individual, such as a celebrity or a person who is closely related to a user of the given client device 102) be deemed more important than other messages exchanged in the conversation from other users. Such messages may be selected by the message synchronization system 124 to be included in the summary over other messages that were exchanged more recently than such messages by other users.

In some cases, the message synchronization system 124 develops a machine learning model (e.g., trains a neural network) to identify patterns of user behavior that indicate a likelihood that a user is interested in a conversation and/or that indicate a likelihood that one message in a conversation is more important than another message. In some circumstances, the message synchronization system 124 generates and trains a machine learning model on a per user basis. The message synchronization system 124 applies the trained machine learning model to the set of messages that are received in one or more conversations to identify a conversation and/or messages that have a likelihood that the user is interested in accessing that exceeds a threshold. The trained machine learning model can generate a score that predicts a likelihood on a per conversation basis and/or per message basis.

The message synchronization system 124 selects the conversations and/or messages with likelihood scores that exceed a certain threshold (or that have the highest values). The message synchronization system 124 then adds the selected conversations and/or messages to the summary. In this way, when the client device 102 later synchronizes content with the message synchronization system 124 (e.g., the server), the message synchronization system 124 sends the summary that includes the most important conversations and/or messages. The client device 102 automatically downloads or retrieves the messages that are part of the conversations that are identified in the summary first before other messages or conversations that have a lower likelihood of interest to the user. The other messages may be retrieved at a later time (e.g., when specifically requested by the user) and/or when bandwidth becomes available or when a battery level exceeds a certain level.

As an example, the message synchronization system 124 trains the machine learning model by processing a collection of past conversations in which a user was involved. The message synchronization system 124 determines that the past user engagement patterns (engagement levels) indicate that a first type of user interaction with a first of the set of past conversations is indicative of a low likelihood of engagement (low engagement level). The first type of user interaction can include at least one of muting or preventing notifications about new messages exchanged in the first of the set of past conversations or accessing the first of the set of past conversations less than a given number of times over a given period. In some cases, the message synchronization system 124 determines that the past user engagement patterns indicate that a second type of user interaction with a second of the set of past conversations is indicative of a high likelihood of engagement. The second type of user interaction can include receiving more than a threshold number of messages from the user in the second of the set of past conversations within a given time interval.

As an example, if the user mutes a given past conversation indicating that no notifications should be provided to the user when new messages are received, the message synchronization system 124 may determine that such a conversation has a low likelihood of engagement. In this way, if a user mutes a given conversation that the user is involved in at a later time, the message synchronization system 124, based on the trained machine learning model, determines that such a conversation has a low likelihood of interest to the user (e.g., the user engagement level is below a specified threshold) and the message synchronization system 124 does not include such a conversation or messages in that conversation in the summary. Alternatively, the message synchronization system 124 defaults to including only the last sent or most recently sent message in that conversation in the summary.

As another example, if the user accesses given past conversation less than a predefined period of time (e.g., once per week), the message synchronization system 124 may determine that such a conversation has a low likelihood of engagement. In this way, if a user accesses a new or current conversation that the user is involved in at a later time less than once per week, the message synchronization system 124, based on the trained machine learning model, determines that such a conversation has a low likelihood of interest to the user and the message synchronization system 124 does not include such a conversation or messages in that conversation in the summary. Alternatively, the message synchronization system 124 defaults to including only the last sent or most recently sent message in that conversation in the summary.

As another example, if the user sends more than a predetermined number of messages (e.g., five messages) in a predefined period of time (e.g., the span of one hour) in a given past conversation indicating that the user engagement level in the conversation exceeds a specified threshold, the message synchronization system 124 may determine that such a conversation has a high likelihood of engagement. In this way, if a user sends more than five messages in the span of an hour or less in a new or current conversation that the user is involved in at a later time, the message synchronization system 124, based on the trained machine learning model, determines that such a conversation has a high likelihood of interest to the user (e.g., because the engagement level of the user exceeds the specified threshold) and the message synchronization system 124 includes such a conversation or messages in that conversation in the summary.

The application server 112 is communicatively coupled to a database server 118, which facilitates access to a database 120 in which is stored data associated with messages processed by the messaging server application 114. Database 120 may be a third-party database. For example, the application server 112 may be associated with a first entity, and the database 120 or a portion of the database 120 may be associated with and hosted by a second, different entity. In some implementations, database 120 stores user data that the first entity collects about various each of the users of a service provided by the first entity. For example, the user data includes user names, passwords, addresses, friends, activity information, preferences, videos or content consumed by the user, and so forth.

Figure 2:
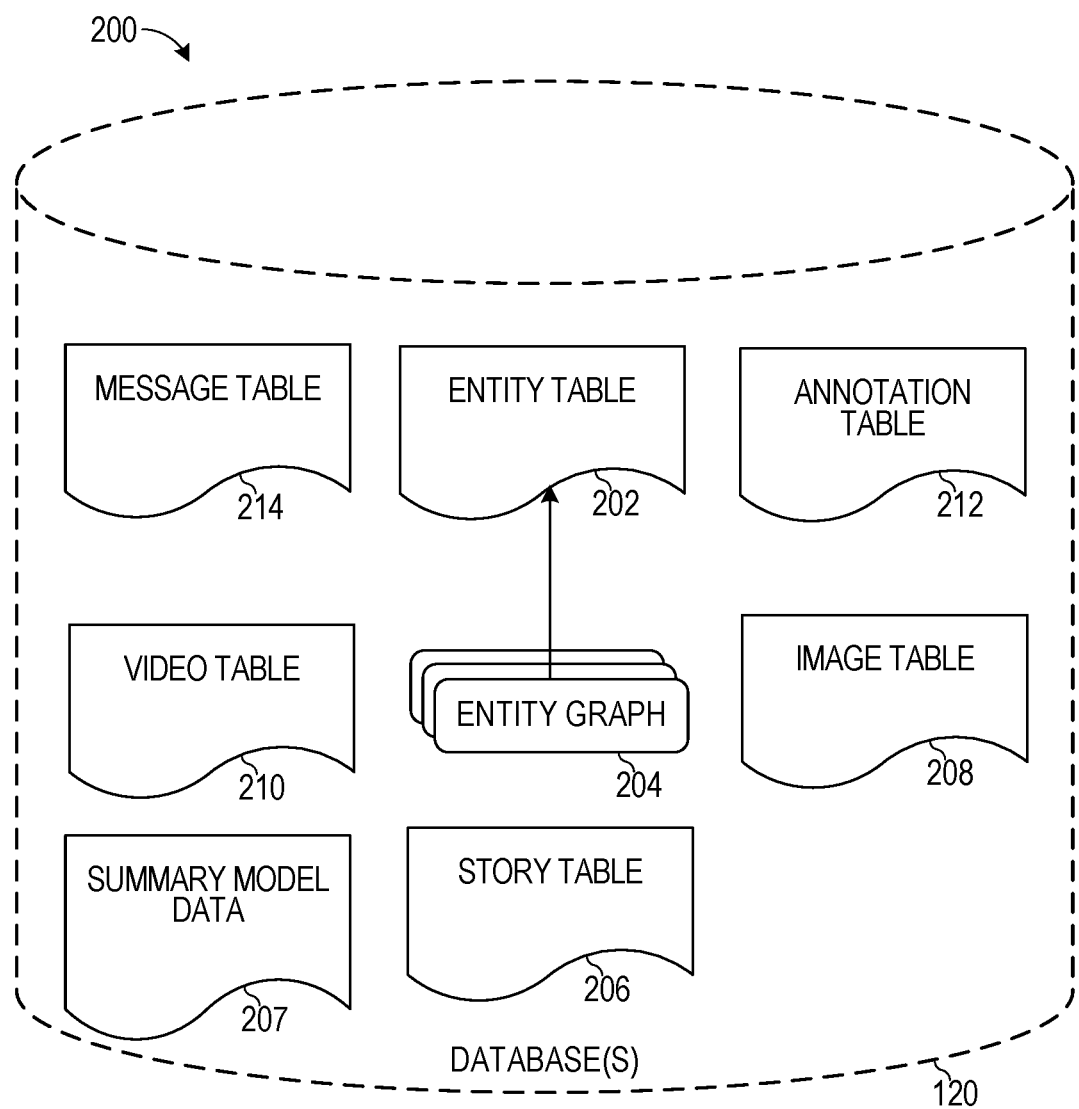
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

Summary model data 207 stores various information about parameters, rules, heuristics, and/or trained machine learning models that are used by the message synchronization system 124 to select and/or identify messages and/or conversations to include in a summary.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
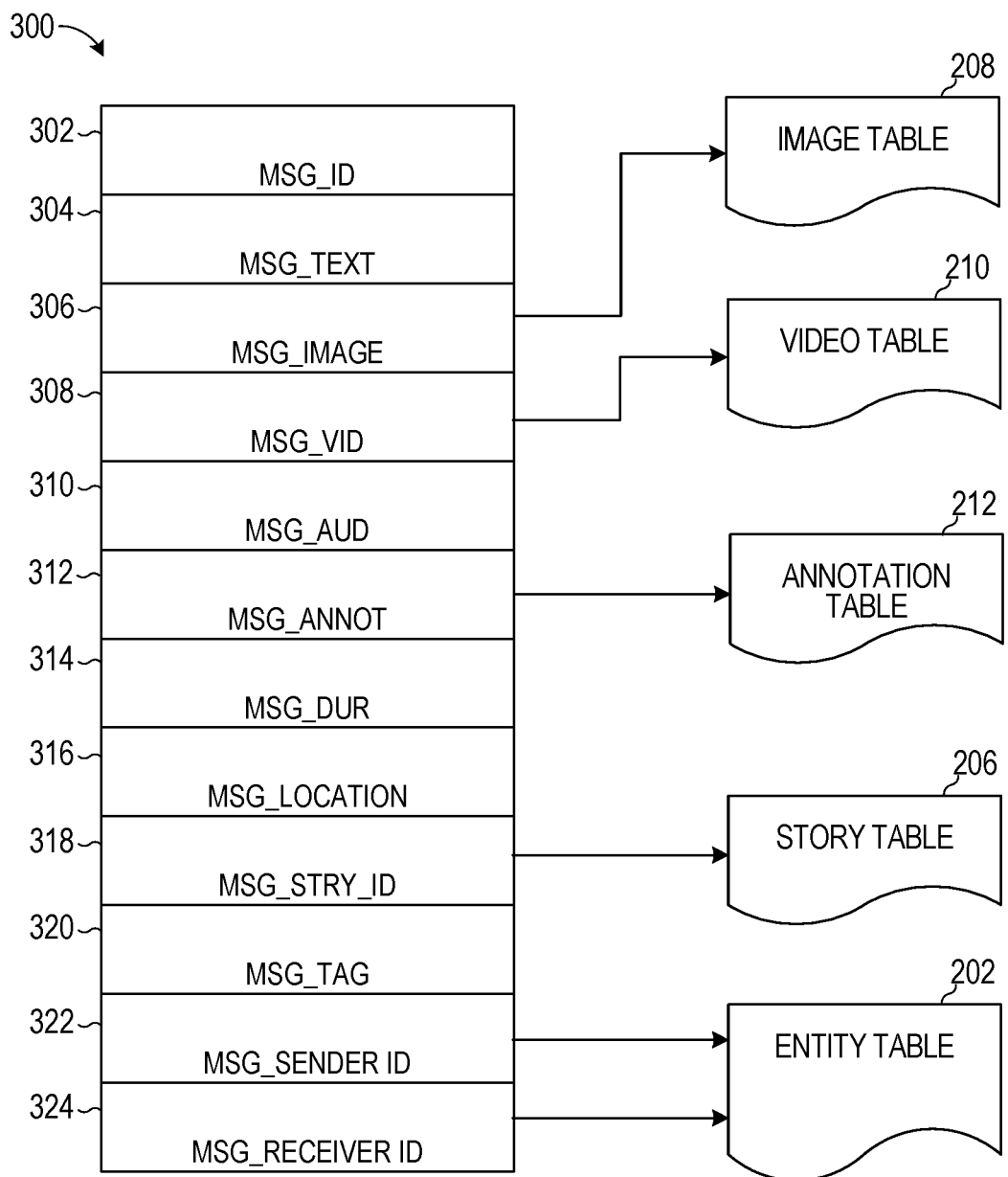
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a UI of the client device 102 and that is included in the message 300.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from the memory component of the client device 102, and that is included in the message 300.

Message annotations 312: annotation data (e.g., filters, stickers, or other enhancements) that represents annotations to be applied to message image payload 306, message video payload 308, or message audio payload 310 of the message 300.

A message duration parameter 314: parameter value indicating, in seconds, the amount of time for which content of the message (e.g., the message image payload 306, message video payload 308, message audio payload 310) is to be presented or made accessible to a user via the messaging client application 104.

A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).

A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
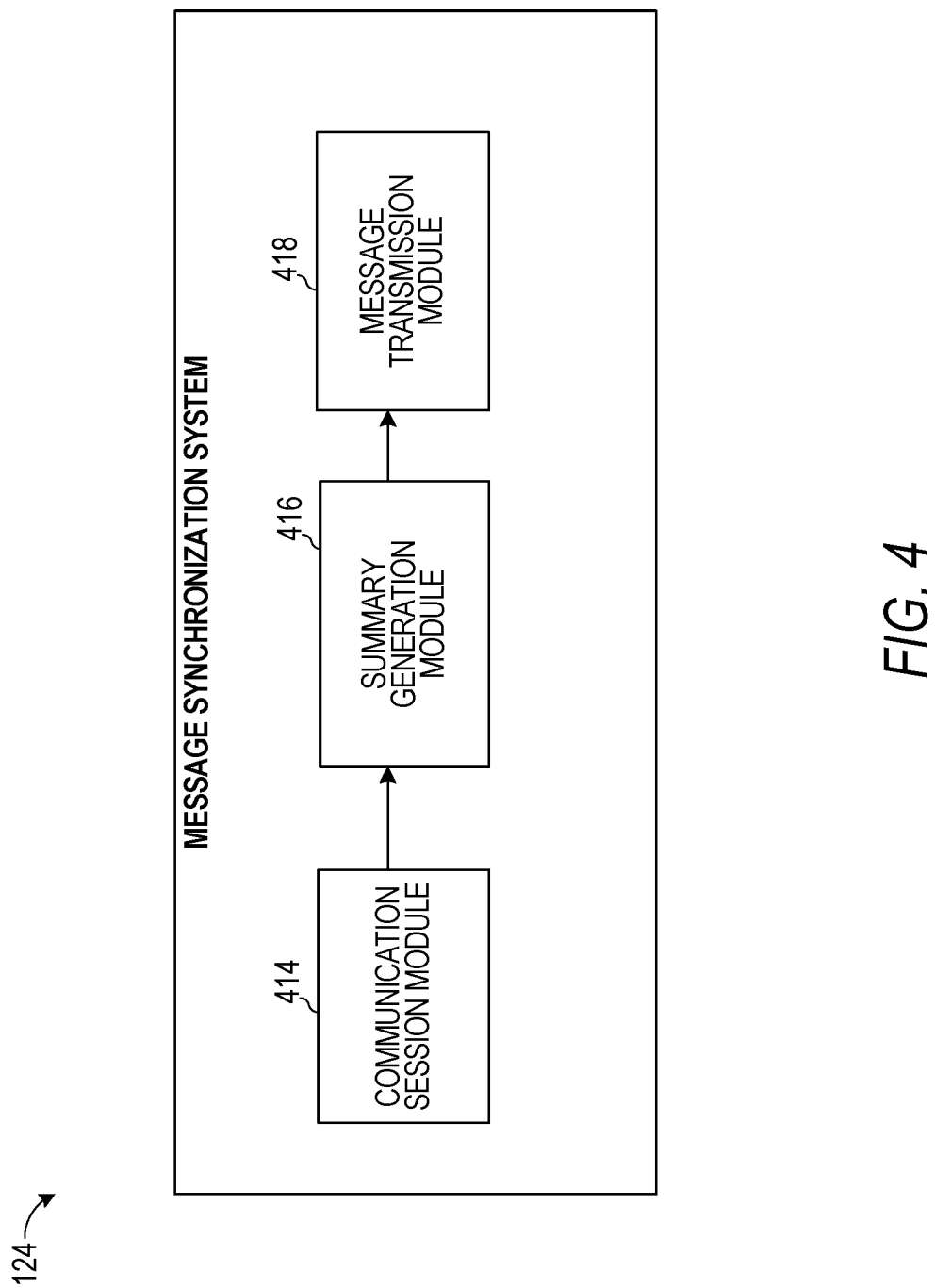
FIG. 4 is a block diagram showing an example message synchronization system, according to example embodiments.

FIG. 4 is a block diagram showing an example message synchronization system 124, according to example embodiments. Message synchronization system 124 includes a communication session module 414, a summary generation module 416, and a message transmission module 418. The communication session module 414 enables users to engage in a communication session to exchange messages with each other. In some cases, the communication session includes a group of three or more users in which case any message sent by one user is viewable by the other two users in the group. In some cases, the communication session includes only two users where one user sends messages to another user and vice versa.

After initiating a communication session using the communication session module 414, messages are transferred between users of the communication session using the communication session module 414. For example, the communication session module 414 receives a message from a first user in the communication session and marks the message for transmission to a second user in the communication session. The communication session module 414 stores the message along with various information indicating the recipient, the communication session identifier, a sequence number, an identifier of the sender, and a timestamp representing when the message was received.

In some cases, in response to receiving a given message from a participant or sender, the communication session module 414 identifies a vector associated with the participant or sender and the value of the last sequence number that is stored in the vector. The communication session module 414 increments the value of the last sequence number that is stored to generate a new sequence number for the given message, associates the new sequence number with the given message, and adds the new sequence number to the vector stored for the sender or participant. In this way, each participant of the communication session is assigned a vector with sequence numbers representing messages sent by the respective participants.

When the second user logs into the message application, the communication session module 414 receives an identifier of the second user and determines whether there are any messages that have not been delivered yet to the second user and that are intended for the second user to receive. In some cases, the communication session module 414 receives a last update timestamp from the second user. The communication session module 414 searches the receive time of all the messages that are intended for receipt by the second user. The communication session module 414 selects those messages that have a receive time that is later than the last update timestamp. The communication session module 414 then sends all of the selected messages to the user device of the second user for presentation in the communication session of the message client application 104.

In some embodiments, after a given user of the communication session logs off, the communication session module 414 stores a timestamp indicating the last time an update was sent to the client device 102 of the user. In some embodiments, the communication session module 414 continuously updates the timestamp for a given client device 102 each time an update including new messages of the communication session is sent to the given client device 102. This way, the timestamp always represents the last time the given client device 102 was connected to and received a message from the communication session module 414.

In some embodiments, after the messaging client application 104 logs off, the summary generation module 416 processes messages that are exchanged in one or more conversations in which the messaging client application 104 of the client device 102 is involved. The summary generation module 416 applies a model to the messages to select and identify messages or conversations that have a high likelihood of importance. Such messages are added to a summary that is generated and maintained by the summary generation module 416. In some cases, the summary generation module 416 processes past conversations in which the user of the messaging client application 104 was involved to generate and train a machine learning model to identify conversations and/or messages that have a high likelihood of interest to the user.

At a later time, the messaging client application 104 may determine a need to synchronize its content (e.g., when a polling period is reached or when a user requests to refresh the data of the messaging client application 104). At that time, the communication session module 414 instructs the summary generation module 416 to send the summary to the messaging client application 104 on the client device 102. The client device 102 processes the data in the summary to generate a display of a summary view that represents the most important messages and/or conversations in which the messaging client application 104 is involved. As an example, a given conversation may have had five sequential messages exchanged after the last time the client device 102 last synchronized its content. The summary generation module 416 processes the five messages in the conversation using a model to identify the most important message in the five messages. Specifically, the model may indicate that message number 3 of the 5 messages (which has a later timestamp than the last time the client device 102 synchronized its content but earlier than the most recent timestamp of message number 5) is the most important. This may be because message number 3 is the first of the 5 messages that has video or image content. In this case, the summary may select message number 3 to include in the summary that is provided to the client device 102.

The message transmission module 418 concurrently with the client device 102 receiving the summary data, sends to the client device 102 messages and/or conversations that are included in the summary data first. Other messages that are not in the summary data are sent to the client device by the message transmission module 418 when specifically requested by the client device 102.

Figure 5:
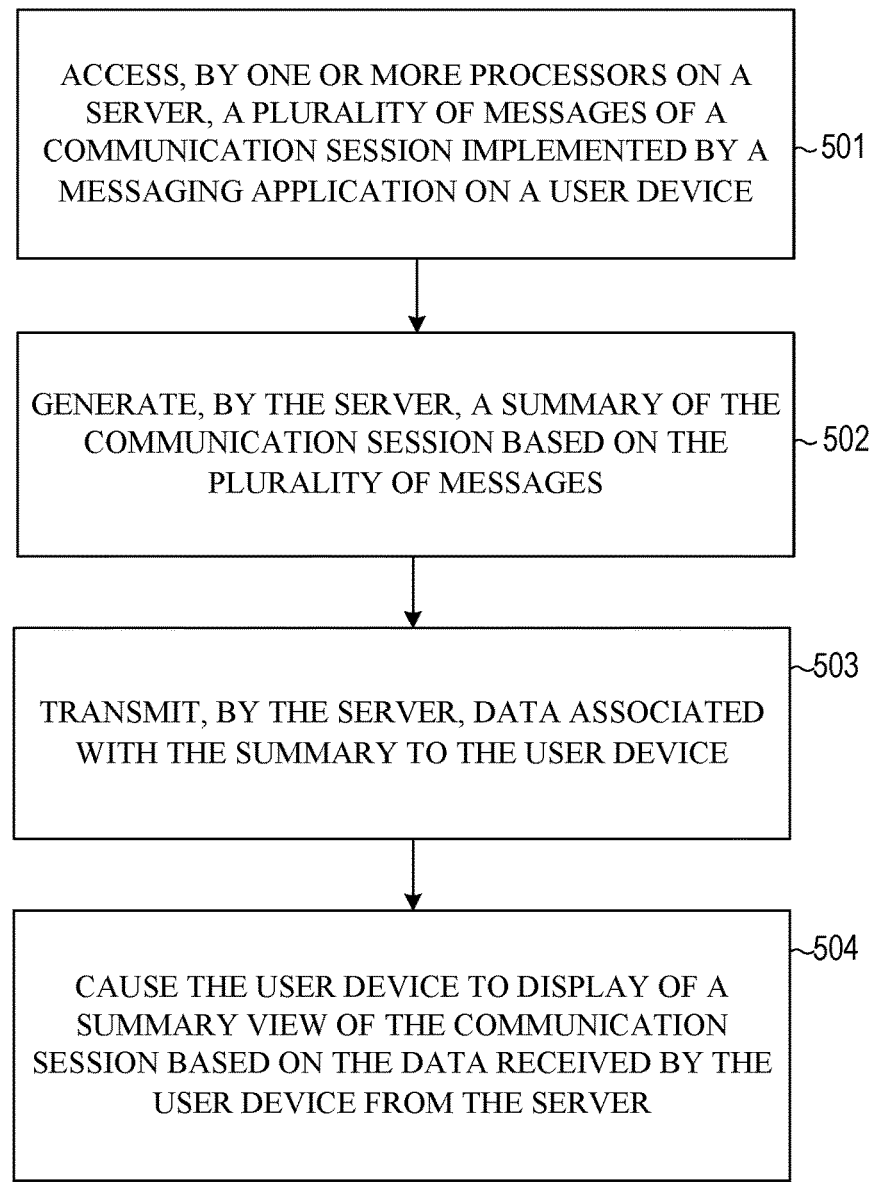
FIG. 5 is a flowchart illustrating example operations of the message synchronization system, according to example embodiments.

FIG. 5 is a flowchart illustrating example operations of the message synchronization system 124 in performing process 500, according to example embodiments. The process 500 may be embodied in computer-readable instructions for execution by one or more processors such that the operations of the process 500 may be performed in part or in whole by the functional components of the messaging server system 108, client device 102, and/or third-party application 105; accordingly, the process 500 is described below by way of example with reference thereto. In other embodiments, at least some of the operations of the process 500 may be deployed on various other hardware configurations. The process 500 is therefore not intended to be limited to the messaging server system 108 and can be implemented in whole, or in part, by any other component. Some or all of the operations of process 500 can be in parallel, out of order, or entirely omitted.

At operation 501, a computing system (e.g., a server that implements message synchronization system 124) accesses a plurality of messages of a communication session implemented by a messaging application on a user device. For example, the message synchronization system 124 accesses messages that are part of one or more conversations in which a client device 102 running a messaging client application 104 is involved.

At operation 502, the computing system generates a summary of the communication session based on the plurality of messages. For example, the message synchronization system 124 applies a model to the one or more conversations and/or messages exchanged in the conversations to identify one or more conversations and/or messages that are important to a user of the client device 102.

At operation 503, the computing system transmits data associated with the summary to the user device. For example, the message synchronization system 124 sends the summary including sequence numbers and/or unique identifiers of messages that are identified as important.

At operation 504, the computing system causes the user device to display a summary view of the communication session based on the data received by the user device from the server. For example, the message synchronization system 124 instructs the client device 102 (e.g., the messaging client application 104) to display a summary view that includes the messages identified in the summary.

In one example embodiment, the client device 102 presents simultaneously a set of conversation identifiers of all or some of the conversations in which the given client device 102 is involved. For each conversation identified in the simultaneous view, the given client device 102 presents the message provided in the summary for that conversation. For example, a first conversation identifier includes the content of the last message exchanged in that first conversation while a second conversation identifier (in the same summary view simultaneously with the first conversation identifier) includes the content of a message exchanged in the second conversation that includes video or image content but not text and that is not the last message exchanged in the second conversation. The given client device 102 may receive input from the user that selects a given conversation identifier from the summary view. In response, the given client device 102 retrieves, from the server, messages that are part of the selected conversation identifier and that have not previously been retrieved from the server.

Figure 6:
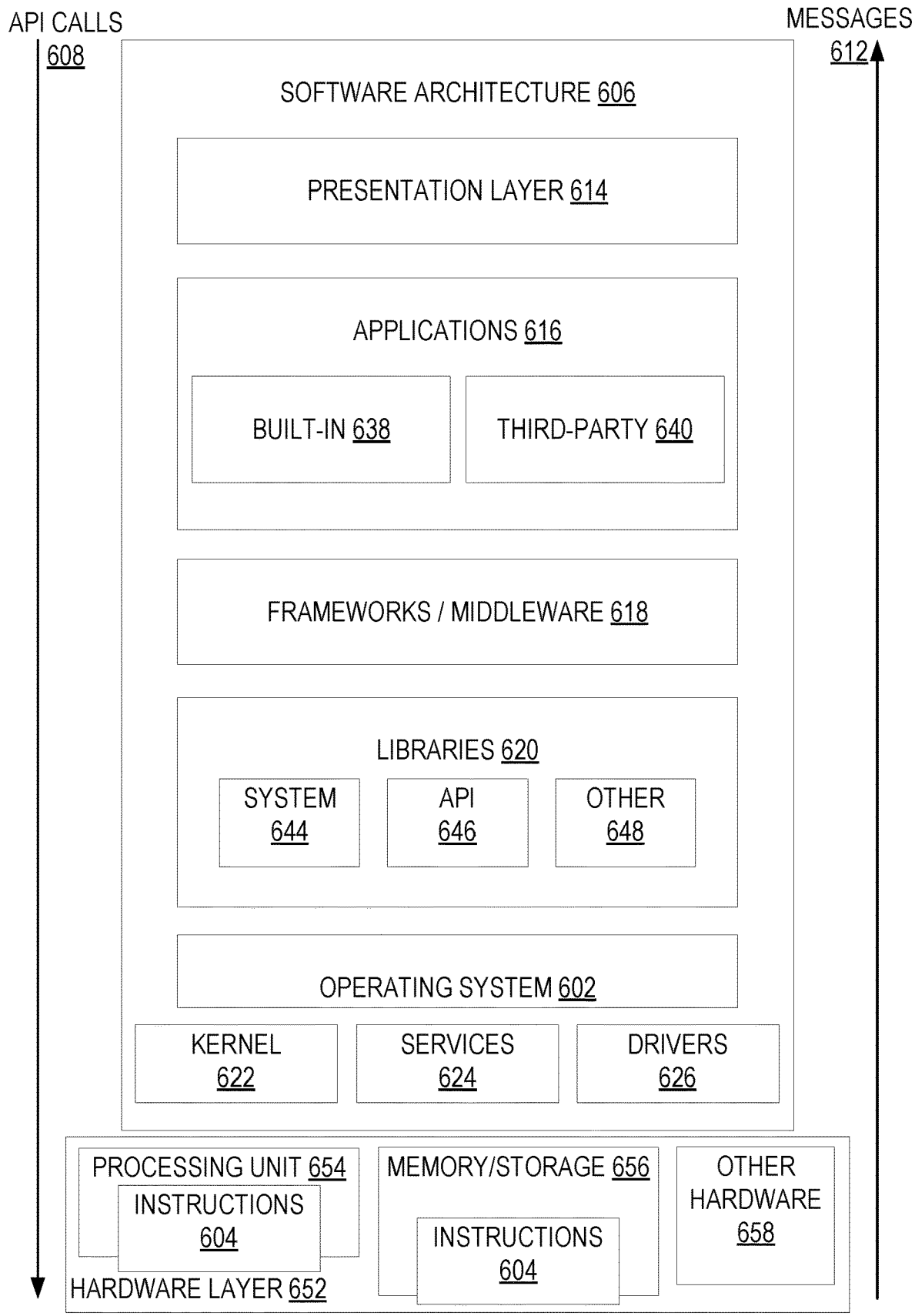
FIG. 6 is a block diagram illustrating a representative software architecture, which may be used in conjunction with various hardware architectures herein described, according to example embodiments.

FIG. 6 is a block diagram illustrating an example software architecture 606, which may be used in conjunction with various hardware architectures herein described. FIG. 6 is a non-limiting example of a software architecture and it will be appreciated that many other architectures may be implemented to facilitate the functionality described herein. The software architecture 606 may execute on hardware such as machine 700 of FIG. 7 that includes, among other things, processors 704, memory 714, and input/output (I/O) components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components, and so forth described herein. The hardware layer 652 also includes memory and/or storage modules memory/storage 656, which also have executable instructions 604. The hardware layer 652 may also comprise other hardware 658.

In the example architecture of FIG. 6, the software architecture 606 may be conceptualized as a stack of layers where each layer provides particular functionality. For example, the software architecture 606 may include layers such as an operating system 602, libraries 620, frameworks/middleware 618, applications 616, and a presentation layer 614. Operationally, the applications 616 and/or other components within the layers may invoke API calls 608 through the software stack and receive messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624, and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624 and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 and/or other software components/modules. For example, the frameworks/middleware 618 may provide various graphical user interface functions, high-level resource management, high-level location services, and so forth. The frameworks/middleware 618 may provide a broad spectrum of other APIs that may be utilized by the applications 616 and/or other software components/modules, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built-in operating system functions (e.g., kernel 622, services 624, and/or drivers 626), libraries 620, and frameworks/middleware 618 to create UIs to interact with users of the system. Alternatively, or additionally, in some systems, interactions with a user may occur through a presentation layer, such as presentation layer 614. In these systems, the application/component "logic" can be separated from the aspects of the application/component that interact with a user.

Figure 7:
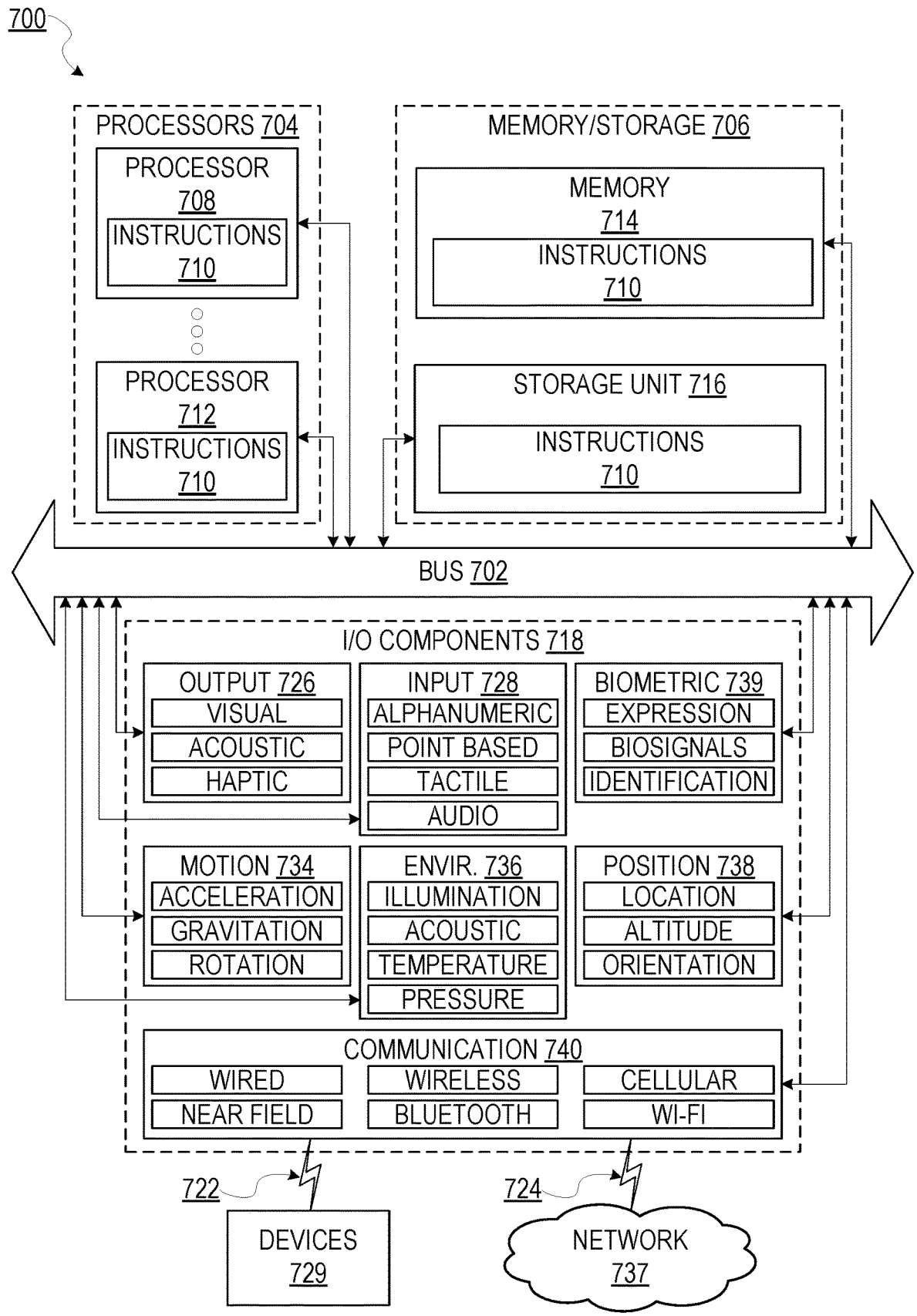
FIG. 7 is a block diagram illustrating components of a machine able to read instructions from a machine-readable medium (e.g., a machine-readable storage medium) and perform any one or more of the methodologies discussed herein, according to example embodiments.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory/storage 706, and I/O components 718, which may be configured to communicate with each other such as via a bus 702. In an example embodiment, the processors 704 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 708 and a processor 712 that may execute the instructions 710. The term "processor" is intended to include multi-core processors 704 that may comprise two or more independent processors (sometimes referred to as "cores") that may execute instructions 710 contemporaneously. Although FIG. 7 shows multiple processors 704, the machine 700 may include a single processor 708 with a single core, a single processor 708 with multiple cores (e.g., a multi-core processor), multiple processors 708, 712 with a single core, multiple processors 708, 712 with multiple cores, or any combination thereof.

The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

The I/O components 718 may include a wide variety of components to receive input, provide output, produce output, transmit information, exchange information, capture measurements, and so on. The specific I/O components 718 that are included in a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various example embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 718 may include biometric components 739, motion components 734, environmental components 736, or position components 738 among a wide array of other components. For example, the biometric components 739 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environmental components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 737 or devices 729 via coupling 724 and coupling 722, respectively. For example, the communication components 740 may include a network interface component or other suitable device to interface with the network 737. In further examples, communication components 740 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 729 may be another machine 700 or any of a wide variety of peripheral devices (e.g., a peripheral device coupled via a USB).

Moreover, the communication components 740 may detect identifiers or include components operable to detect identifiers. For example, the communication components 740 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as location via Internet Protocol (IP) geo-location, location via Wi-Fi® signal triangulation, location via detecting a NFC beacon signal that may indicate a particular location, and so forth.

Glossary

"CARRIER SIGNAL," in this context, refers to any intangible medium that is capable of storing, encoding, or carrying transitory or non-transitory instructions 710 for execution by the machine 700, and includes digital or analog communications signals or other intangible medium to facilitate communication of such instructions 710. Instructions 710 may be transmitted or received over the network 106 using a transitory or non-transitory transmission medium via a network interface device and using any one of a number of well-known transfer protocols.

"CLIENT DEVICE," in this context, refers to any machine 700 that interfaces to a communications network 106 to obtain resources from one or more server systems or other client devices 102. A client device 102 may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network 106.

"COMMUNICATIONS NETWORK," in this context, refers to one or more portions of a network 106 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 106 or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE," in this context, refers to a message 300 that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message 300 is transitory.

"MACHINE-READABLE MEDIUM," in this context, refers to a component, device, or other tangible media able to store instructions 710 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 710. The term "machine-readable medium" shall also be taken to include any medium, or combination of multiple media, that is capable of storing instructions 710 (e.g., code) for execution by a machine 700, such that the instructions 710, when executed by one or more processors 704 of the machine 700, cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT," in this context, refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor 708 or other programmable processor. Once configured by such software, hardware components become specific machines (or specific components of a machine 700) uniquely tailored to perform the configured functions and are no longer general-purpose processors 708. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 708 configured by software to become a special-purpose processor, the general-purpose processor 708 may be configured as respectively different special-purpose processors (e.g., comprising different hardware components) at different times. Software accordingly configures a particular processor 708 or processors 704, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors 704 that are temporarily configured (e.g., by software) or permanently configured to perform the relevant operations. Whether temporarily or permanently configured, such processors 704 may constitute processor-implemented components that operate to perform one or more operations or functions described herein. As used herein, "processor-implemented component" refers to a hardware component implemented using one or more processors 704. Similarly, the methods described herein may be at least partially processor-implemented, with a particular processor 708 or processors 704 being an example of hardware. For example, at least some of the operations of a method may be performed by one or more processors 704 or processor-implemented components. Moreover, the one or more processors 704 may also operate to support performance of the relevant operations in a "cloud computing" environment or as a "software as a service" (SaaS). For example, at least some of the operations may be performed by a group of computers (as examples of machines 700 including processors 704), with these operations being accessible via a network 106 (e.g., the Internet) and via one or more appropriate interfaces (e.g., an API). The performance of certain of the operations may be distributed among the processors, not only residing within a single machine 700, but deployed across a number of machines. In some example embodiments, the processors 704 or processor-implemented components may be located in a single geographic location (e.g., within a home environment, an office environment, or a server farm). In other example embodiments, the processors 704 or processor-implemented components may be distributed across a number of geographic locations.

"PROCESSOR," in this context, refers to any circuit or virtual circuit (a physical circuit emulated by logic executing on an actual processor 708) that manipulates data values according to control signals (e.g., "commands," "op codes," "machine code," etc.) and which produces corresponding output signals that are applied to operate a machine 700. A processor 708 may, for example, be a CPU, a RISC processor, a CISC processor, a GPU, a DSP, an ASIC, a RFIC or any combination thereof. A processor 708 may further be a multi-core processor having two or more independent processors 704 (sometimes referred to as "cores") that may execute instructions 710 contemporaneously.

"TIMESTAMP," in this context, refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
    accessing, by one or more processors on a server, a plurality of messages of a communication session implemented by a messaging application on a user device;
    generating, by the server, a summary of the communication session based on the plurality of messages, the generating the summary comprising:
        determining that a first message of the plurality of messages that was received prior to a second message of the plurality of messages includes a video or an image, the second message including only text; and
        in response to determining that the first message includes the video or image and that the second message includes only text, selecting the first message for the summary instead of the second message;
    transmitting, by the server, data associated with the summary to the user device; and
    causing the user device to display of a summary view of the communication session based on the data received by the user device from the server.

2. The method of claim 1, wherein the summary view represents messages exchanged in a plurality of conversations of the communication session, and further comprising:
    applying, by the server, a model to the plurality of messages to generate the summary.

3. The method of claim 2, wherein the model includes rules for selecting a subset of the plurality of messages to include in the summary.

4. The method of claim 3, wherein a first collection of the plurality of messages is associated with a first conversation in the communication, wherein the first collection includes the first and second messages, and wherein the first message is selected for the summary by applying a rule of the model.

5. The method of claim 4, wherein a second collection of the plurality of messages is associated with a second conversation in the communication, further comprising:
    determining that a third message in the second collection that was received after a fourth message in the second collection includes a video with audio content;
    determining that the fourth message in the collection includes a video without audio content; and
    in response to determining that the third message includes the video with audio content and that the fourth message includes video without audio content, applying a rule of the model to select the third message for the summary instead of the fourth message.

6. The method of claim 5, wherein the first message and the third message are presented simultaneously in the summary view without providing the second message and the fourth message to the user device.

7. The method of claim 5, wherein the server receives a request from the user device to download the second message after the summary view is displayed on the user device and in response to the user device receiving a user request to view the first conversation.

8. The method of claim 5, wherein a third collection of the plurality of messages is associated with a third conversation in the communication, and further comprising:
    determining that an engagement level of a user of the user device in the third conversation is less than a threshold; and
    in response to determining that the engagement level of the user of the user device in the third conversation is less than the threshold, applying a rule of the model to select a fifth message that was last exchanged in the third conversation for the summary.

9. The method of claim 1, further comprising:
    providing, to the user device, the plurality of messages corresponding to the summary view of the communication session, wherein a second message that is not in the summary view is not provided to the user device.

10. The method of claim 1, further comprising:
    accessing a trained machine learning model, the machine learning model having been trained based on communication patterns of a user of the user device to predict a likelihood of engagement with a conversation in the communication session; and
    applying the trained machine learning model to the plurality of messages to select one or more messages for inclusion in the summary based on the predicted likelihood of engagement of the user with one or more conversations in which the one or more messages were exchanged.

11. The method of claim 10, further comprising:
    obtaining past user engagement patterns with a set of past conversations;
    determining that the past user engagement patterns indicate that a first type of user interaction with a first of the set of past conversations is indicative of a low likelihood of engagement;
    determining that the past user engagement patterns indicate that a second type of user interaction with a second of the set of past conversations is indicative of a high likelihood of engagement; and
    training the machine learning model based on the first and second types of user interactions.

12. The method of claim 11, wherein the first type of user interaction comprises at least one of muting or preventing notifications about new messages exchanged in the first of the set of past conversations or accessing the first of the set of past conversations less than a specified number of times over a specified period.

13. The method of claim 12, wherein the specified number of times is once, and wherein the specified period is one week.

14. The method of claim 11, wherein the second type of user interaction comprises receiving more than a threshold number of messages from the user in the second of the set of past conversations within a specified time interval.

15. A system comprising:
    a processor configured to perform operations comprising:
    accessing a plurality of messages of a communication session implemented by a messaging application on a user device;
    generating a summary of the communication session based on the plurality of messages, the generating the summary comprising:
        determining that a first message of the plurality of messages that was received prior to a second message of the plurality of messages includes a video or an image, the second message including only text; and in response to determining that the first message includes the video or image and that the second message includes only text, selecting the first message for the summary instead of the second message;

transmitting data associated with the summary to the user device; and causing the user device to display of a summary view of the communication session based on the data received by the user device from a server.

16. The system of claim 15, wherein the summary view represents messages exchanged in a plurality of conversations of the communication session, and the operations further comprise:

applying a rule of a model to the plurality of messages to generate the summary.

17. The system of claim 16, wherein the model includes rules for selecting subsets of the plurality of messages to include in the summary.

18. The system of claim 17, wherein a first collection of the plurality of messages is associated with a first conversation in the communication, wherein the first collection includes the first and second messages, and wherein the first message is selected for the summary by applying a rule of the model.

19. The system of claim 18, wherein a second collection of the plurality of messages is associated with a second conversation in the communication, and the operations further comprise:

determining that a third message in the second collection that was received after a fourth message in the second collection includes a video with audio content;

determining that the fourth message in the collection includes a video without audio content; and in response to determining that the third message includes the video with audio content and that the fourth message includes video without audio content, applying a rule of the model to select the third message for the summary instead of the fourth message.

20. A non-transitory machine-readable storage medium that includes instructions that, when executed by one or more processors of a machine, cause the machine to perform operations comprising:

accessing a plurality of messages of a communication session implemented by a messaging application on a user device;

generating a summary of the communication session based on the plurality of messages, the generating the summary comprising:

determining that a first message of the plurality of messages that was received prior to a second message of the plurality of messages includes a video or an image, the second message including only text; and in response to determining that the first message includes the video or image and that the second message includes only text, selecting the first message for the summary instead of the second message;

transmitting data associated with the summary to the user device; and causing the user device to display of a summary view of the communication session based on the data received by the user device from a server.

* * * * *